United States Patent [19]

Sako

[11] Patent Number: 5,802,246
[45] Date of Patent: Sep. 1, 1998

[54] DATA RECORDING METHOD

[75] Inventor: Yoichiro Sako, Chiba, Japan

[73] Assignee: Sony Corporation, Tokyo, Japan

[21] Appl. No.: 768,901

[22] Filed: Dec. 17, 1996

Related U.S. Application Data

[63] Continuation of Ser. No. 414,179, Mar. 31, 1995, abandoned, which is a continuation of Ser. No. 183,383, Jan. 13, 1994, abandoned, which is a continuation of Ser. No. 968,802, Oct. 30, 1992, abandoned.

[30] Foreign Application Priority Data

Oct. 30, 1991 [JP] Japan ............................. 3-285122

[51] Int. Cl.$^6$ ............................. H04N 5/76; H04N 5/781
[52] U.S. Cl. ............................. 386/105; 386/106; 386/125; 369/32; 369/48
[58] Field of Search ............................. 386/46, 95, 96, 386/104, 105, 106, 125; 369/32, 48, 49, 47, 50, 51, 52, 53, 54; H04N 5/76, 5/781

[56] References Cited

U.S. PATENT DOCUMENTS

| | | | |
|---|---|---|---|
| 4,866,540 | 9/1989 | Okatani | 386/105 |
| 5,142,521 | 8/1992 | Terashima et al. | 369/50 |
| 5,249,170 | 9/1993 | Yoshimaru et al. | 358/342 |
| 5,257,248 | 10/1993 | Ogasawara | 369/32 |
| 5,329,512 | 7/1994 | Fukimoto et al. | 369/121 |
| 5,341,359 | 8/1994 | Birukawa et al. | 369/107 |
| 5,343,453 | 8/1994 | Ogino | 369/32 |

*Primary Examiner*—Thai Tran
*Assistant Examiner*—Huy Nguyen
*Attorney, Agent, or Firm*—Lise A. Rode, Esq.; Jerry A. Miller

[57] ABSTRACT

A method of recording data onto a disk-like storage medium which is rotated at a constant angular velocity. A number of radially aligned recording zones are defined along the disk and data is recorded into a selected recording zones which allow the data to be recorded to, or read from, the selected recording zone at a data transfer rate which is optimum for the type of data being recorded.

7 Claims, 5 Drawing Sheets

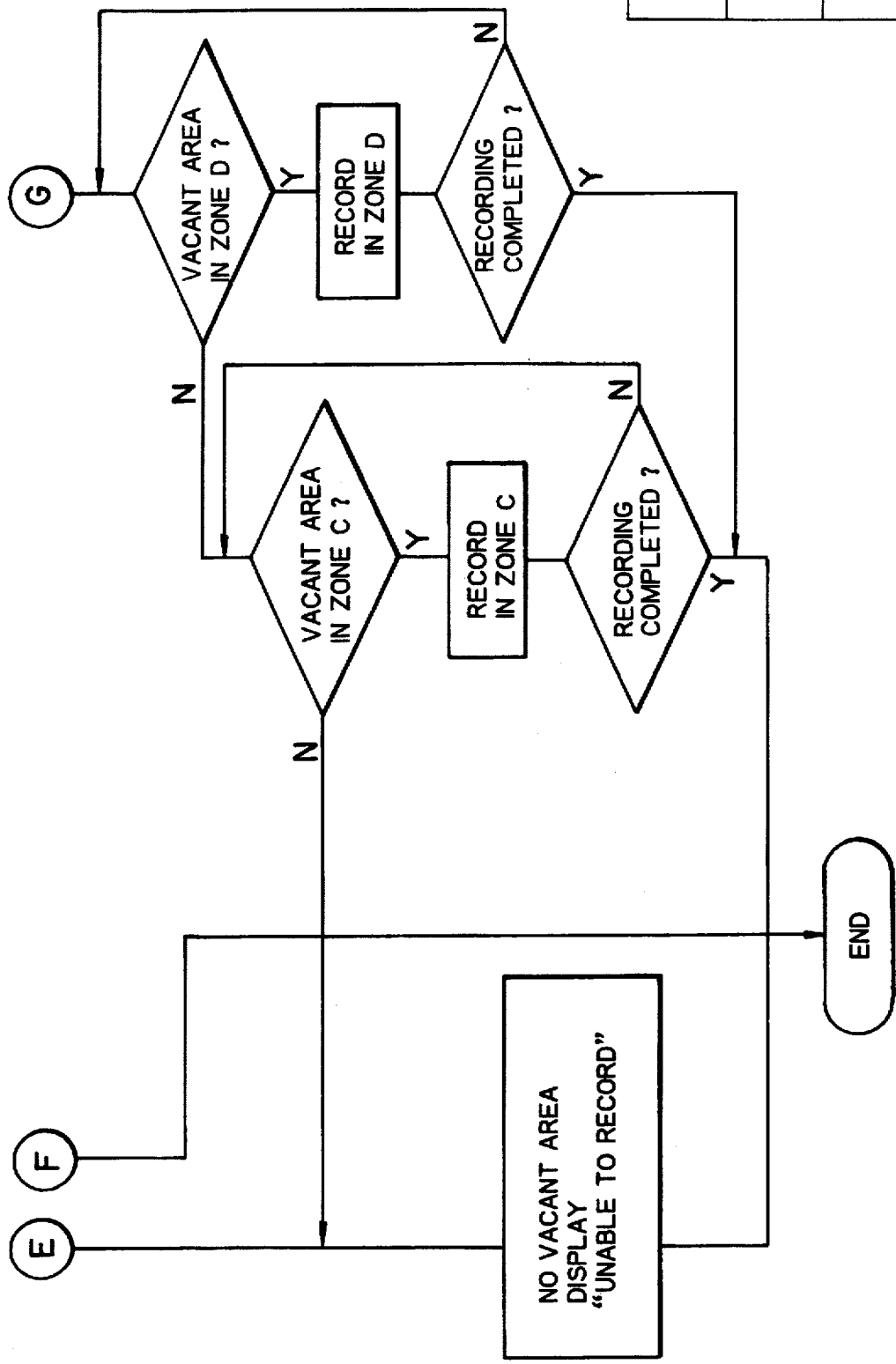

DATA RECORDING METHOD

This is a continuation of application Ser. No. 08/414,179 filed on Mar. 31, 1995, abandoned, which is a continuation of Ser. No. 08/183,383 filed on Jan. 13, 1994, abandoned, which is a continuation of Ser. No. 07/968/802 filed on Oct. 30, 1992 abandoned, which is hereby incorporated by reference.

BACKGROUND

1. Field of the Invention

The present invention relates to a method for recording data on a disk which has a plurality of radially arranged divided zones and which rotates at a constant angular velocity.

2. Background of the Invention

To increase the capacity of data recording, it has been proposed to adopt a zoning method for a disk which rotates at a constant angular velocity (See, for example a Japanese Patent Application Hei 03-208160). In such a method, the disk is divided into a plurality of radially aligned zones. The outer zone of the disk has the greatest capacity for storing data in a single track. While reading data from the disk, the data is read out at different transfer rates depending upon the location of the zones on the disk.

SUMMARY OF THE INVENTION

It is, therefore, an object of the present invention to record data onto a disk so as to allow data recorded on the disk to be read out at different data transfer rates depending upon the location of the zone in which data is recorded.

In one aspect of the present invention, a method for recording data onto a disk is provided which defines a plurality of recording zones which are radially arranged on the disk. The disk is rotated at a constant angular velocity during recording and playback of data. A single zone for recording data is selected from among the plurality of recording zones depending upon the kind of input data to be recorded, so that the data can be recorded and played back to or from the selected zone at the most appropriate data transfer rate.

The present invention allows the zone for recording data to be selected in accordance with the particular kind of data which is to be recorded or input. Thus, the data recording and reading can be performed at the most appropriate data transfer rate.

BRIEF DESCRIPTION OF THE DRAWING

The invention will be more readily understood with reference to the accompanying drawing, wherein.

DESCRIPTION OF THE INVENTION

Figure 2:
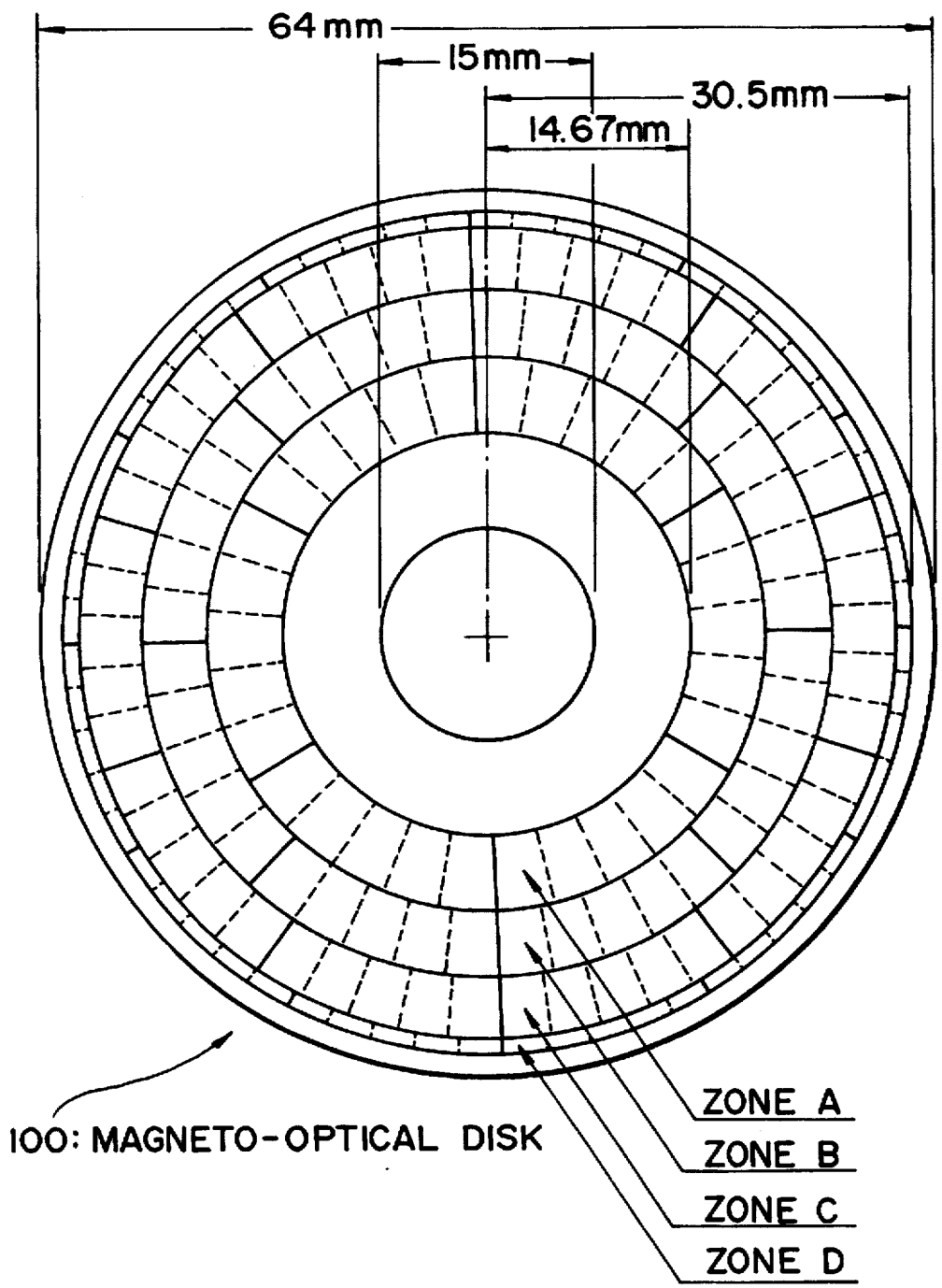
FIG. 2 shows zone assignments on a magneto-optical disk for use in the apparatus shown in FIG. 1.

Referring now to FIG. 2, a magneto-optical disk 100 is disclosed for use in the recording and reproducing apparatus. The data recording area of disk 100 is divided into four zones A to D which are radially aligned on the disk. In each zone A to D, solid and dotted lines extending along the radial direction respectively show a border of a sector.

It is provided that each sector shall have 512 bytes (B) of User Data. The User Data in each zone A to D becomes as follows, where K=1024:

Zone A . . . 30 Sector/Track=15 KB/Track;
Zone B . . . 40 Sector/Track=20 KB/Track;
Zone C . . . 50 Sector/Track=25 KB/Track;
Zone D . . . 60 Sector/Track=30 KB/Track.

When a disk is rotating at 3600 rpm (=60 rps), the data transfer rate in each zone A to D becomes as follows:

Zone A . . . 900 KB/s=7.2 Mbps;
Zone B . . . 1.2 MB/s=9.6 Mbps;
Zone C . . . 1.5 MB/s=12.0 Mbps;
Zone D . . . 1.8 MB/s=14.4 Mbps;

Although it is not described here, the well known Sample Servo method has been adopted for a Tracking Servo control of the disk 100. The actual dimensions of an embodiment of disk 100 are disclosed in FIG. 2.

With regard to the appropriate transfer rates needed for particular kinds of data, it would be sufficient for audio data, etc. to be transferred at around 1 Mbps. However, for high picture quality of video data or the like to be transferred, it may require at least around 100 Mbps. For data such as for computer, it would be better to be transferred at a high transfer rate, although a low transfer rate may also be utilized instead.

As described above, the preferred data transfer rates vary depending on the kind of data being read or recorded. It is therefore, beneficial to select the location of recording zone in accordance with the kind of data being recorded.

In this embodiment, audio data Au is recorded into a vacant area of the zone A→B →C →D in order. Video data Vi (more than 10 Mbps) is recorded into a vacant area of the zone D→C, in order. Computer data Da such as characters are recorded into a vacant area of the Zone D→C→B→A, in order.

Figure 1:
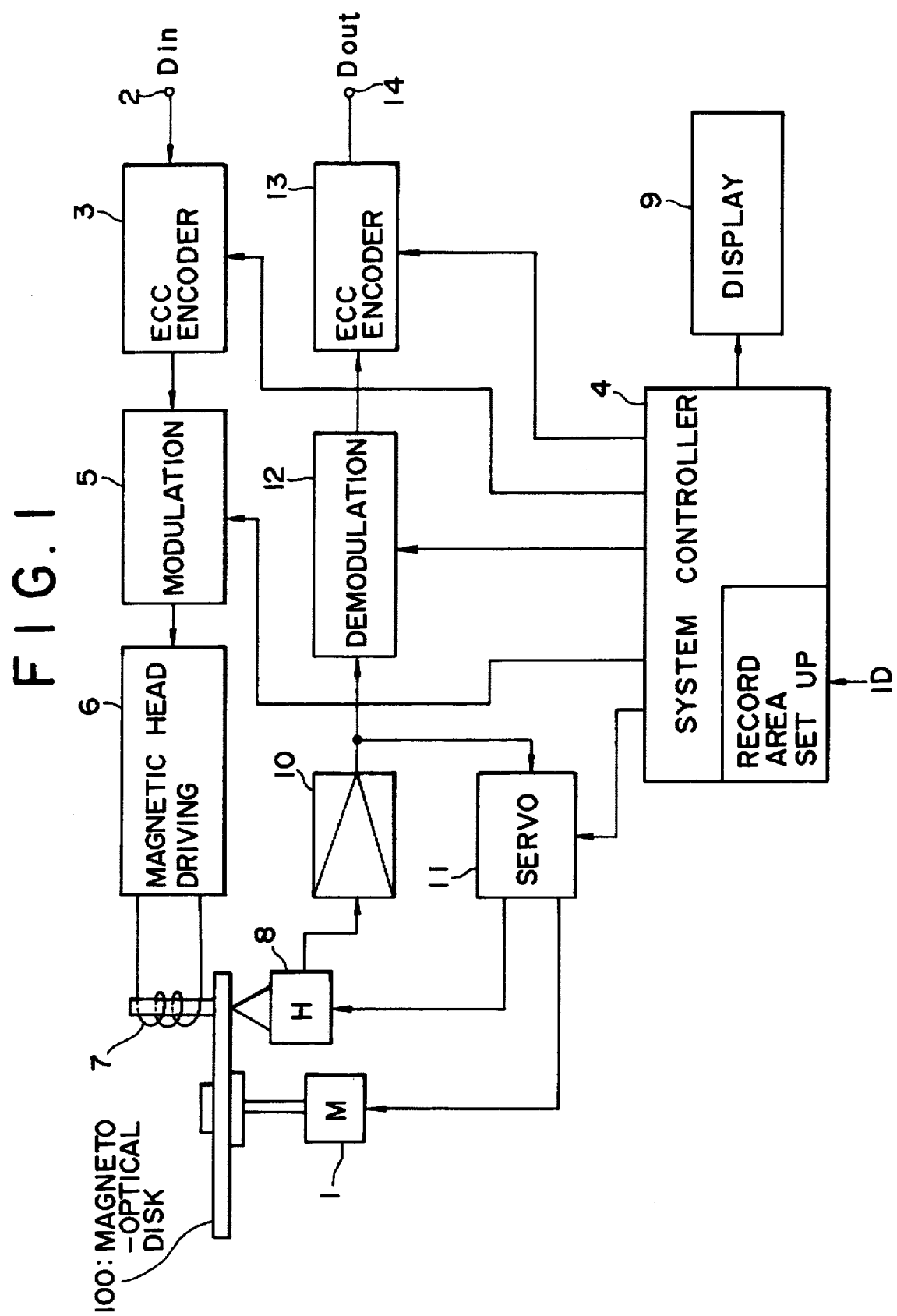
FIG. 1 shows a block diagram of a magneto-optical disk apparatus as an embodiment of the present invention.

Referring now to FIG. 1, a magneto-optical apparatus is disclosed as one embodiment of the present invention. A magneto-optical disk 100 is rotated by a spindle motor 1. Data, such as audio data Au, Video data Vi (more than 10 Mbps) or Computer data Da (such as characters) are derived from an input terminal 2 as data Din. The data Din is supplied to an ECC (Error Correction Code) encoder 3 where error detection code and error correction code are added to the data Din. The operation of encoder 3 is controlled by a system controller 4 with a CPU. Although it will not be described, it will be easily understood that each circuit below can also be controlled by the controller 4.

The ECC encoded data out of ECC encoder 3 is supplied to a modulation circuit 5 where the modulation process is performed. The output of modulation circuits is sent to a magnetic head driving circuit 6. A magnetic head 7 generates magnetic field corresponding to the modulated signal and works together with a laser beam from an optical head 8 so as to record the modulated signal onto the magneto-optical disk 100.

A data ID representing each kind of possible input data (example: audio data, video data or computer data) Din is provided to the controller 4. This data ID can be automatically provided with respect to the input data Din, for example, by detecting the transfer rate of the input data. The data ID can also be created by manually operating keyboards. The data ID represents each kind of possible input; audio data Au, video data Vi or computer data Da.

Figure 3A:
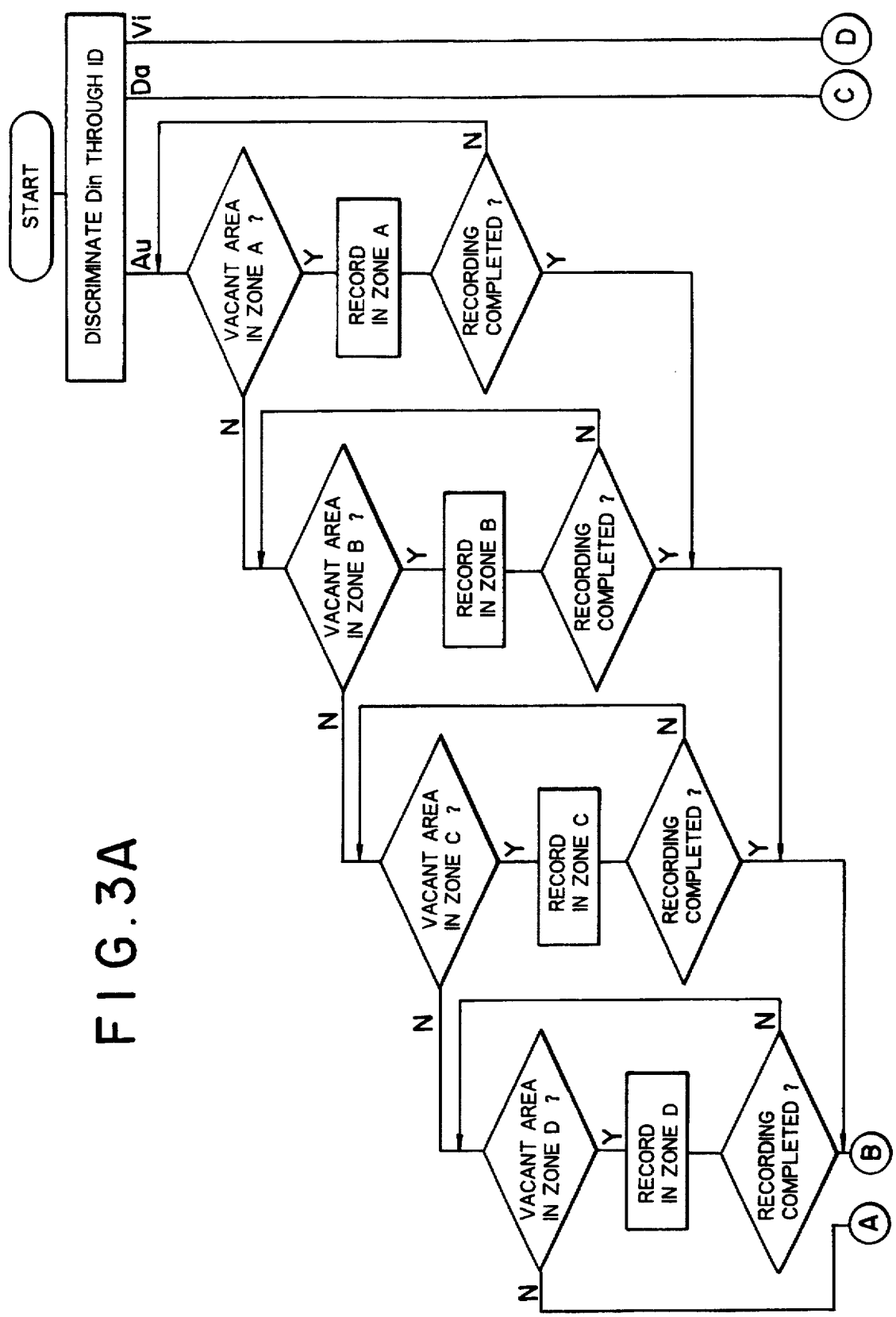
FIG. 3 shows a flow chart representing a procedure for selecting the zone where the data should be recorded.
Figure 3B:
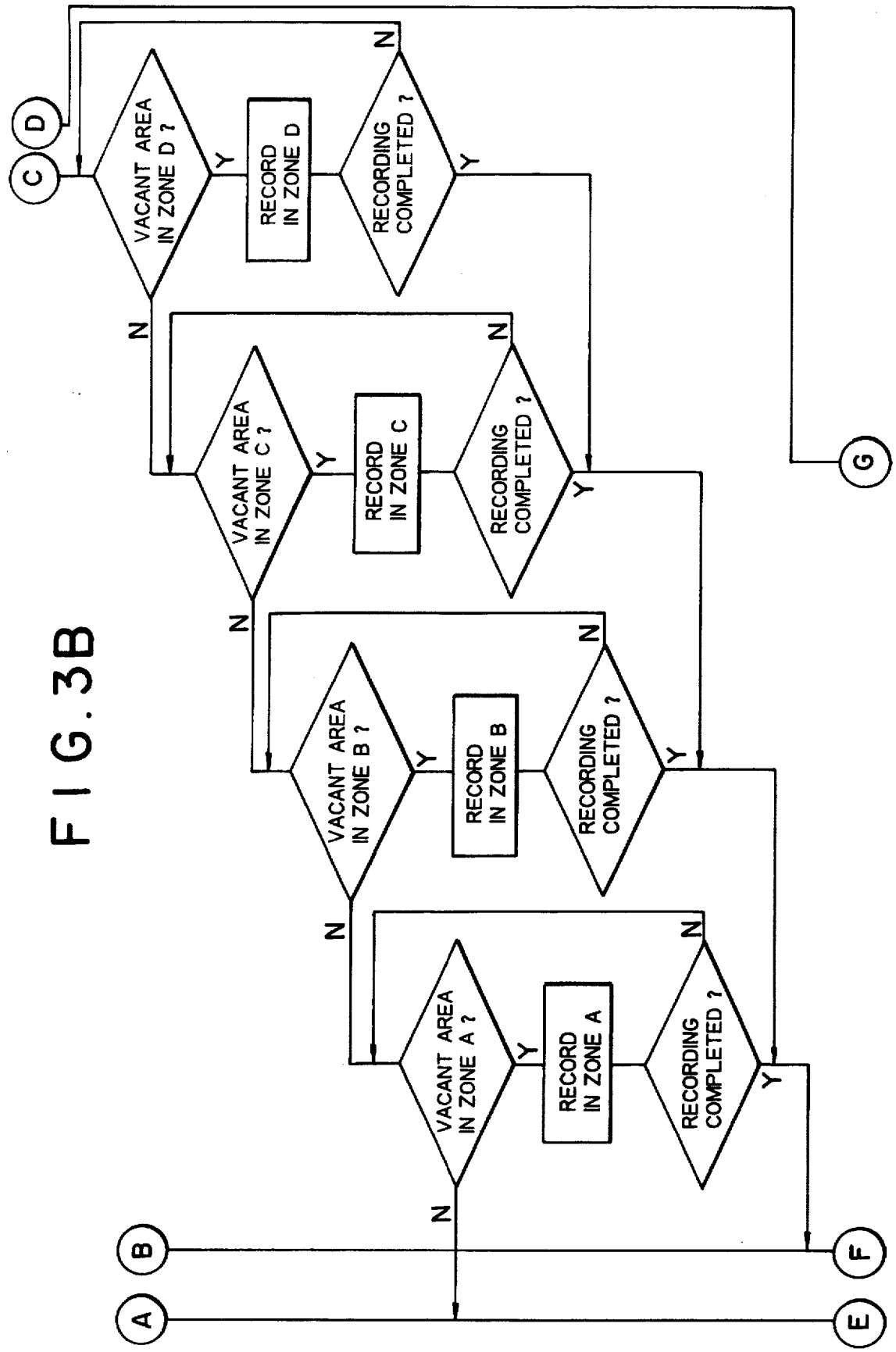

The data ID is supplied to a port for setting up the record area of the controller 4 so as to determine the zone on a magneto-optical disk 100 where the data ID should be recorded. A flowchart shown in FIG. 3 illustrates the process of the zone determination and record control functions performed in the controller 4. Although it is not described in detail, whether or not there is any vacant area can be detected by searching an area called "Read-In". The data recorded in the "Read-In" area represents the locations on the disk where data is actually recorded. This data is renewed whenever new input data is recorded onto the disk.

When the input data Din is determined to be audio data Au, it is recorded in vacant area of zone A→B→C→D in order. When the input data Din is judged as video data Vi, it is recorded in vacant area of zone D→C in order. Further, when the input data is judged as computer data Da, it is recorded in vacant area of zone D→C→B→A, in order. When there is no vacant area to be recorded or the vacant area is insufficient for recording, a display 9 can display a message such as, for example, "no vacant area, unable to record".

Referring to FIG. 1, the played back signal out of the magneto-optical disk 100 is supplied to an amplifier 10 to be amplified. The output signal from amplifier 10 is supplied to a servo control circuit 11. Servo control of an optical head 8 such as for example, moving it along a radial path, a tracking servo and a focus servo can be performed based on this played back signal. In addition, the servo circuit 11 controls the rotation of the spindle motor 1 so as to make the magneto-optical disk 100 rotate at a constant angular velocity such as, for example, 3600 rpm.

The output of amplifier 10 is supplied to a demodulating circuit 12 where the played back signal or modulated signal, is demodulated and then supplied to an ECC decoder 13. After performing the error detection and error correction process, data Dout is supplied to an output terminal 14.

The transfer rate of data Dout from the magneto-optical disk 100 will vary depending on the area or location on the disk where the data is read out. In other words, when the magneto-optical disk 100 rotates at 3600 rpm, the transfer rate out of zone A, B, C and D respectively becomes 7.2 Mbps, 9.6 Mbps, 12.0 Mbps and 14.4 Mbps.

In this embodiment, the zone for recording can be selected in accordance with the kind of data which is being input. Therefore, depending upon the kind of data being read or recorded, data recording and reading can be performed at the most appropriate data transfer rate.

Since the order of zones is determined depending on the kind of input data, like the order of zone A→B→C→D for audio data Au, the recording area of magneto-optical disk 100 can be most efficiently used or consumed. For example, if the audio data Au are recorded first into the zone D or C where we can achieve a high transfer rate, it would cause problems since the video data Vi cannot be recorded onto the disk later even though there are vacant areas on the disk in zones A or B. This is because video data cannot be properly transferred and stored into zones A or B because of the lower data transfer rates associated with these zones. The above embodiment of the present invention can avoid this problem.

While specific embodiments of the invention have been shown and disclosed, it is understood that numerous changes and modifications may be made by those skilled in the art without departing from the scope and intent of the invention.

Video data Vi may be recorded only into the zone D or C in the above embodiment. It will be realized, however, that the above embodiment may be modified, for example, so that video data may also be recorded into zones B and A, at a lower transfer rate, once zones D and C are full. However, it may cause degradation of picture quality.

The divided zones on a magneto-optical disk, the plurality of data Di and the procedure for determination of zone to be recorded in this embodiment are disclosed as an example. Of course, changes and modifications of the described embodiment may be made.

In addition, although the embodiment is explained with the erasable magneto-optical disk 100, the invention can be applicable to a system in which the data is recorded on a non-erasable optical disk (Write Once type) or other recording media.

What is claimed is:

1. An apparatus for recording different types of data on an optical disk having a plurality of concentric zones, said zones each having a plurality of sectors, said apparatus comprising:

encoding means for encoding said data;

recording means for recording said encoded data on said optical disk; and, control means for discriminating said data type, and for controlling said recording means according to said discriminated data type, wherein when said discriminated data is low transfer rate data, said recording means commences recording said low transfer rate data on an inner of said concentric zones near said center of said optical disk and continues to record said low transfer rate data on concentric zones adjacent said inner concentric zone and closer to said outer periphery of said optical disk, and wherein when said discriminated data is high transfer rate data, said recording means commences recording said high transfer rate data on an outer concentric zone near said outer periphery of said optical disk and continues to record said high transfer rate data on concentric zones adjacent said inner concentric zone and closer to said center of said optical disk.

2. The apparatus of claim 1, wherein further comprising disk driving means for driving said optical disk at a constant angular velocity.

3. The apparatus of claim 2, wherein said control means further determines whether any of said plurality of sectors of said optical disk are recordable, and further comprising a display for indicating when said control means determines that none of said said plurality of sectors are recordable.

4. An apparatus for recording different types of data on an optical disk having a plurality of concentric zones, said zones each having a plurality of sectors, said apparatus comprising:

encoding means for encoding said data;

recording means for recording said encoded data on said optical disk; and, control means for discriminating said data type, and for controlling said recording means according to said discriminated data type, wherein when said discriminated data is audio data, said recording means commences recording said audio data on an inner of said concentric zones near said center of said optical disk and continues to record said audio data on concentric zones adjacent said inner concentric zone and closer to said outer periphery of said optical disk, and wherein when said discriminated data is video data, said recording means commences recording said video data on an outer concentric zone near said outer periphery of said optical disk and continues to record said video data on concentric zones adjacent said inner concentric zone and closer to said center of said optical disk.

5. The apparatus of claim 4, further comprising the steps of:

determining whether any of said plurality of sectors of said optical disk are recordable; and, providing on a display an indicator if it is determined that none of said said plurality of sectors are recordable.

6. The apparatus of claim 4, wherein when said discriminated data is computer data, said recording means commences recording said computer data on an outer concentric zone near said outer periphery of said optical disk and continues to record said computer data on concentric zones adjacent said inner concentric zone and closer to said center of said optical disk.

7. A method for recording different types of data on an optical disk having a plurality of concentric zones, said zones each having a plurality of sectors, said method comprising the steps of:

discriminating said data to determine the type of data;

determining where to commence recording of said data on said optical disk based on said discriminated data;

recording said discriminated data on said optical disk, wherein when said discriminated data is low transfer rate data, said data is first recorded on an inner of said concentric zones near said center of said optical disk and then recorded concentric zones adjacent said inner concentric zone and closer to said outer periphery of said optical disk, and wherein when said discriminated data is high transfer rate data, said data is first recorded on an outer concentric zone near said outer periphery of said optical disk and then recorded on concentric zones adjacent said inner concentric zone and closer to said center of said optical disk.

* * * * *